US008519653B2

(12) United States Patent
Takamatsu et al.

(10) Patent No.: US 8,519,653 B2
(45) Date of Patent: Aug. 27, 2013

(54) CONTROL DEVICE AND CONTROL METHOD FOR AC MOTOR

(75) Inventors: Naoyoshi Takamatsu, Susono (JP); Masaki Okamura, Toyota (JP); Takanori Degaki, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 112 days.

(21) Appl. No.: 13/146,178

(22) PCT Filed: May 29, 2009

(86) PCT No.: PCT/JP2009/059853
§ 371 (c)(1),
(2), (4) Date: Jul. 25, 2011

(87) PCT Pub. No.: WO2010/137162
PCT Pub. Date: Dec. 2, 2010

(65) Prior Publication Data
US 2012/0056569 A1     Mar. 8, 2012

(51) Int. Cl.
*H02P 6/14*  (2006.01)
(52) U.S. Cl.
USPC ............... 318/400.26; 318/400.13; 318/712; 318/802; 363/41; 363/131
(58) Field of Classification Search
USPC ................ 318/712, 801, 802, 807, 400.26, 318/400.13; 363/41, 131, 132
See application file for complete search history.

(56) References Cited

U.S. PATENT DOCUMENTS 5,250,890 A * 10/1993 Tanamachi et al. ........... 318/811
5,532,569 A * 7/1996 Tanamachi et al. ........... 318/802
5,736,825 A * 4/1998 Kaura et al. .................. 318/599
6,023,417 A * 2/2000 Hava et al. ..................... 363/41
6,088,246 A * 7/2000 Okuyama et al. ............... 363/41
6,324,085 B2 * 11/2001 Kimura et al. ................ 363/132

(Continued)

FOREIGN PATENT DOCUMENTS

JP    U-58-100495    7/1983
JP    A-60-190169    9/1985

(Continued)

OTHER PUBLICATIONS

International Search Report in International Application No. PCT/JP2009/059853; dated Sep. 1, 2009 (with English-language translation).

*Primary Examiner* — Paul Ip
(74) *Attorney, Agent, or Firm* — Oliff & Berridge, PLC

(57) ABSTRACT

A control device for performing PWM control of an inverter includes a synchronous PWM control circuit for generating a control command for the inverter by performing PWM control based on a comparison between a sinusoidal voltage command signal for operating the AC motor according to, an operation command and a carrier signal, and a carrier generating unit for keeping an integer as a synchronization number being a frequency ratio between the voltage command signal and the carrier signal, and producing the carrier signal by switching the synchronization number according to an operation state of the AC motor. The carrier generating unit adjusts a phase relationship between the voltage command signal and the carrier signal according to the synchronization number such that an AC current transmitted between the inverter and the AC motor according to the control command provided from the synchronous PWM control circuit is symmetrical with respect to a boundary between positive and negative portions.

8 Claims, 12 Drawing Sheets

(56) References Cited

U.S. PATENT DOCUMENTS

| | | | |
|---|---|---|---|
| 6,819,077 B1 * | 11/2004 | Seibel et al. | 318/801 |
| 7,714,529 B2 * | 5/2010 | Chen et al. | 318/712 |
| 8,138,712 B2 * | 3/2012 | Yamada | 318/807 |
| 8,330,405 B2 * | 12/2012 | Royak et al. | 318/400.13 |
| 2001/0015904 A1 * | 8/2001 | Kimura et al. | 363/131 |
| 2004/0232902 A1 * | 11/2004 | Seibel et al. | 323/284 |
| 2005/0248306 A1 * | 11/2005 | Chen et al. | 318/712 |
| 2008/0291710 A1 | 11/2008 | Aoki et al. | |
| 2010/0052583 A1 * | 3/2010 | Takamatsu et al. | 318/400.09 |
| 2010/0164416 A1 * | 7/2010 | Yamada | 318/400.13 |
| 2010/0320948 A1 * | 12/2010 | Royak et al. | 318/400.13 |

FOREIGN PATENT DOCUMENTS

| | | |
|---|---|---|
| JP | A-10-108474 | 4/1998 |
| JP | A-2000-324842 | 11/2000 |
| JP | A-2001-145387 | 5/2001 |
| JP | A-2008-086099 | 4/2008 |
| JP | A-2008-294067 | 12/2008 |
| JP | A-2008-312420 | 12/2008 |

\* cited by examiner

UNIT[deg]

| | LOW ←—ROTATION SPEED—→ HIGH | | | | | | | |
|---|---|---|---|---|---|---|---|---|
| HIGH ↑ TORQUE ↓ LOW | 25 | 25 | 25 | 25 | 30 | 30 | 30 | 35 |
| | 25 | 25 | 25 | 25 | 30 | 30 | 30 | 35 |
| | 25 | 25 | 25 | 25 | 30 | 30 | 30 | 30 |
| | 25 | 25 | 25 | 25 | 30 | 30 | 30 | 30 |
| | 25 | 25 | 25 | 25 | 30 | 30 | 30 | 30 |
| | 25 | 25 | 25 | 25 | 30 | 30 | 30 | 30 |
| | N1 | N2 | N3 | N4 | N5 | N6 | N7 | N8 | N9 ··· |

(A)

CONTROL DEVICE AND CONTROL METHOD FOR AC MOTOR

TECHNICAL FIELD

The present invention relates to a control device and a control method for an AC motor, and particularly to control of the AC motor employing a synchronous Pulse Width Modulation (PWM) control.

BACKGROUND ART

A drive method using an inverter has been employed for performing drive control of an AC motor with a DC power supply. For example, in a motor vehicle such as an electric vehicle, a hybrid vehicle, a fuel-cell electric vehicle or the like, the inverter generally controls an output torque of an AC motor employed for vehicle running. Typically, the AC motor is supplied with a voltage switched by the inverter according to the PWM control that is based on a comparison between voltages of a voltage command and a carrier.

In connection with the control of the AC motor, for example, Japanese Patent Laying-Open No. 2000-324842 (Patent Document 1) has disclosed a control device of an electric power converting device. This control device includes a reference voltage generator that performs AC/DC conversion of a power by controlling on/off of a plurality of switching elements according to a control signal and thereby provides a reference voltage, a carrier generator that provides a saw-tooth carrier having a frequency sufficiently higher than that of an AC output or an AC input, a comparator that provides a PWM signal controlling on/off of the plurality of switching elements by comparing levels of the reference voltage and the saw-tooth carrier with each other, and a correction signal generator generating a correction signal that exhibits a symmetrical wave with respect to the frequency of the AC output or input.

In the patent literature 1, a correction signal corrects the saw-tooth carrier of the carrier generator to provide a corrected carrier that is a symmetrical wave with respect to the frequency of the AC output or AC input, and this corrected carrier corrects the PWM signal provided from the comparator. Thereby, the PWM signal is corrected to form the symmetrical wave with respect to the frequency of the AC output or AC input, and the corrected PWM signal does not include a low-order harmonic of the even-numbered order so that it is possible to reduce a distortion of the waveform of the AC output or AC input due to the low-order harmonic.

CITATION LIST

Patent Literature

PTL 1: Japanese Patent Laying-Open No. 2000-324842
PTL 2: Japanese Patent Laying-Open No. 10-108474
PTL 3: Japanese Patent Laying-Open No. 2008-086099
PTL 4: Japanese Patent Laying-Open No. 2001-145387
PTL 5: Japanese Patent Laying-Open No. 2008-294067

SUMMARY OF INVENTION

Technical Problem

However, according to the patent document 1, the control device additionally requires a correction signal generator that provides a correction signal for correcting the saw-tooth carrier to provide the corrected carrier so that the PWM signal may be corrected to form the symmetrical wave with respect to the frequency of the AC output or AC input. For implementing this correction signal generator, it is necessary to add an above kind of control logic to a microcomputer or the like forming the control device. However, addition of the special logic impairs general versatility, resulting in difficulty in mass production and thus a problem relating to cost.

Inverters for driving the vehicle are severely required to have small and inexpensive structures. Particularly, generation of a high torque increases a current-carrying loss of the inverter and therefore its heat value so that it is necessary in this region to prevent overheating and to reduce heat generation. Conversely, the current-carrying loss cannot be reduced because such reduction restricts the current to be passed through the AC motor for producing a torque required for the vehicle drive. Consequently, the reduction of the heat value requires the reduction in switching loss, and it is required to perform the operation by the switching circuits that are as small in number as possible.

An operation region where the inverter generates a high torque under severe thermal conditions is used with a relatively low frequency with respect to a whole drive region of the motor vehicle. Therefore, when the inverter is designed to endure the thermal conditions in this specific region, this wastefully and thus unpreferably increases the size and cost of the inverter. The AC motor has a large heat capacity, and therefore allows certain increase in loss even when a harmonic component superimposed on the AC current transmitted to/from the invert increases to a certain extent, if a time length of such increase in loss is short. Conversely, the switching element that is a heat generation unit in the inverter has a small heat capacity and therefore will be overheated within a short time. Therefore, it is necessary to suppress the switching loss by operating it as small a number of times as possible.

The invention has been made for overcoming the above problem, and an object of the invention is to provide AC motor control that suppresses increase in cost and the overheating of an inverter.

Solution to Problem

The invention provides a control device of an AC motor is supplied with a voltage controlled by an inverter, and the control device of the AC motor includes a pulse width modulation control unit for generating a control command for the inverter by performing pulse width modulation control based on a comparison between a sinusoidal voltage command signal for operating the AC motor according to an operation command and a carrier signal; and a carrier generating unit for keeping an integer as a synchronization number being a frequency ratio between the voltage command signal and the carrier signal, and producing the carrier signal by switching the synchronization number according to an operation state of the AC motor. The carrier generating unit adjusts a phase relationship between the voltage command signal and the carrier signal according to the synchronization number such that an AC current transmitted between the inverter and the AC motor according to the control command provided from the pulse width modulation control unit is symmetrical with respect to a boundary between positive and negative portions.

The inventing provides a control method of an AC motor supplied with a voltage controlled by an inverter, and the control method of the AC motor includes the steps of generating a control command for the inverter by performing pulse width modulation control based on a comparison between a sinusoidal voltage command signal for operating the AC motor according to an operation command and a carrier signal; and keeping an integer as a synchronization number being a frequency ratio between the voltage command signal and the carrier signal, and producing the carrier signal by switching the synchronization number according to an operation state of the AC motor. The step of producing the carrier signal adjusts a phase relationship between the voltage command signal and the carrier signal according to the synchronization number such that an AC current transmitted between the inverter and the AC motor according to the control command provided from a pulse width modulation control unit is symmetrical with respect to a boundary between positive and negative portions.

The carrier generating unit includes a frequency control unit for controlling a frequency of the carrier signal according to an electrical frequency of the AC motor such that the frequency of the carrier signal is equal to a product of the electrical frequency of the AC motor and the synchronization number, a reference phase setting unit for setting, according to the synchronization number, a reference phase of the carrier signal to be matched with a zero point of the voltage command signal such that the AC current is symmetrical with respect to the boundary between the positive and negative portions, and a synchronous phase control unit for correcting the frequency of the carrier signal such that the voltage command signal and the carrier signal are synchronized with each other while keeping a phase relationship set by the reference phase setting unit.

Preferably, the step of producing the carrier signal includes the steps of controlling a frequency of the carrier signal according to an electrical frequency of the AC motor such that the frequency of the carrier signal is equal to a product of the electrical frequency of the AC motor and the synchronization number, setting, according to the synchronization number, a reference phase of the carrier signal to be matched with a zero point of the voltage command signal such that the AC current is symmetrical with respect to the boundary between the positive and negative portions, and correcting the frequency of the carrier signal such that the voltage command signal and the carrier signal are synchronized with each other while keeping a phase relationship set by the step of setting the reference phase.

Preferably, the reference phase setting unit or the step of setting the reference phase variably sets the reference phase of the carrier signal according to an operation state of the AC motor when the synchronization number is even.

Preferably, the frequency control unit or the step of controlling the frequency controls the frequency of the carrier signal according to the electrical frequency of the AC motor to decrease the synchronization number when a torque of the AC motor is equal to or larger than a threshold. The reference phase setting unit or the step of setting the reference phase variably sets the reference phase of the carrier signal according to the torque and a rotation speed of the AC motor when the synchronization number is even and the torque of the AC motor is equal to or larger than the threshold.

Advantageous Effects of Invention

The invention does not require a dedicated circuit, and implements the synchronous PWM control that can suppress positive-negative asymmetry of the AC current caused by superimposing the even-order harmonic. Consequently, the invention can implement the AC motor control that suppresses increase in cost and prevents overheating of the inverter.

DESCRIPTION OF EMBODIMENTS

Embodiments of the invention will now be described with reference to the drawings. In the following description, the same or corresponding portions bear the same reference numbers.

(Whole System Structure)

Figure 1:
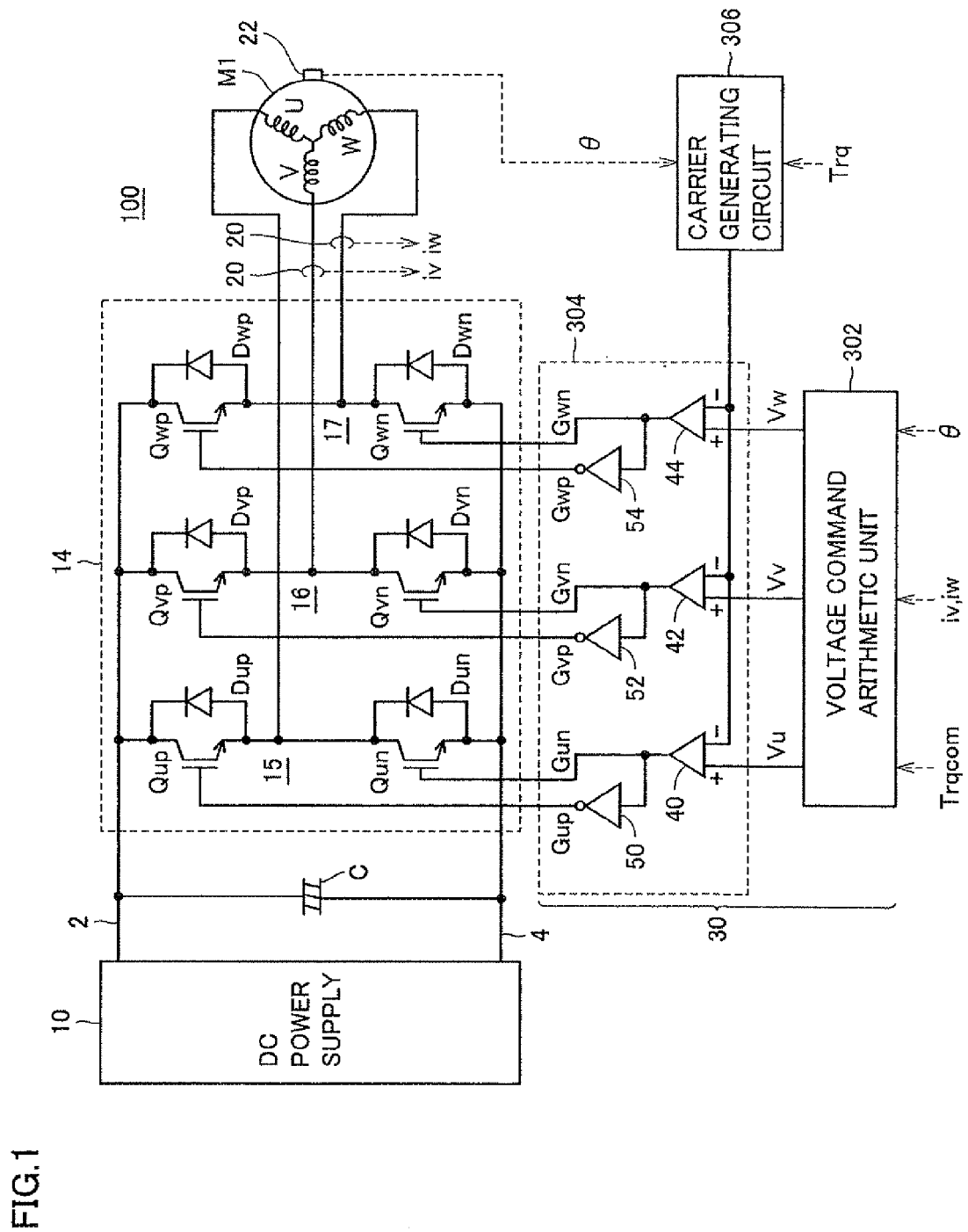
FIG. 1 shows a whole structure of a motor drive control system employing a control device and a control method of an AC motor according to an embodiment of the invention.

FIG. 1 shows a whole structure of a motor drive control system 100 employing a control device and a control method of an AC motor according to an embodiment of the invention.

Referring to FIG. 1, a motor drive control system 100 includes a DC power supply 10, a smoothing capacitor C, an inverter 14, an AC motor M1 and a control device 30.

AC motor M1 is, e.g., a drive motor for generating a torque that drives drive wheels of a motor vehicle (i.e., an automobile such as a hybrid vehicle, an electric vehicle, a fuel-cell electric vehicle or the like generating a vehicle drive power from an electric energy). AC motor M1 may be configured to have a function of an electric generator driven by an engine, or may be configured to have both the functions of the electric motor and the electric generator. Further, AC motor M1 may be configured to operate as an electric motor with respect to the engine and, for example, may be incorporated into a hybrid vehicle for starting the engine. Thus, in the embodiment, the "AC motor" includes an electric motor, an electric generator and a motor generator of an AC-drive type.

DC power supply 10 includes a power storage device, and provides a DC voltage between a power supply line 2 and a ground line 4. For example, DC power supply 10 can be configured such that a combination of a secondary battery and a step-up and step-down converter boosts an output voltage of the secondary battery to apply it between power supply line 2 and ground line 4. In this case, the step-up and step-down converter is configured to allow bidirectional power conversion, and converts the DC voltage between power supply line 2 and ground line 4 to a charge voltage for the secondary battery.

Smoothing capacitor C is connected between power supply line 2 and ground line 4.

Inverter 14 is formed of upper and lower arms 15, 16 and 17 of U-, V- and W-phases that are arranged in parallel between power supply line 2 and ground line 4. The upper and lower arms of each phase is formed of power semiconductor switching elements which are connected in series between power supply line 2 and ground line 4, and will be simply referred to as the "switching elements" hereinafter. For example, upper and lower U-phase arms 15 are formed of switching elements Qup and Qun, respectively. Upper and lower V-phase arms 16 are formed of switching elements Qvp and Qvn, respectively, and upper and lower arms 17 are formed of switching elements Qwp and Qwn, respectively. Anti-parallel diodes Dup, Dun, Dvp, Dvn, Dwp and Dwn are connected to switching elements Qup, Qun, Qvp, Qvn, Qwp and Qwn, respectively. Switching control signals Gup, Gun, Gyp, Gvn, Gwp and Own control the turn-on/off of switching elements Qup, Qun, Qvp, Qvn, Qwp and Qwn, respectively.

Typically, AC motor M1 is a synchronous motor of a three-phase permanent magnet type, and one end of each of three, i.e., U-, V- and W-phase coils is commonly connected to a neutral point. The other end of the coil of each phase is connected to a middle point between the respective switching elements of upper and lower arms 15, 16 or 17 of each phase.

Smoothing capacitor C smoothes the DC voltage supplied from DC power supply 10, and supplies the smoothed DC voltage to inverter 14.

When a torque command value of AC motor M1 is positive (Trqcom>0) and inverter 14 is supplied with the DC voltage from smoothing capacitor C, inverter 14 performs a switching operation in response to switching control signals Gup, Gun, Gyp, Gvn, Gwp and Own supplied from control device 30 to convert the DC voltage to the AC voltage, and thereby drives AC motor M1 to output a positive torque. When the torque command value of AC motor M1 is zero (Trqcom=0), inverter 14 performs the switching operation in response to switching control signals Gup, Gun, Gyp, Gvn, Gwp and Gwn to convert the DC voltage to the AC voltage, and thereby drives AC motor M1 to output a torque of 0. In this manner, AC motor M1 is driven to generate a zero or positive torque indicated by torque command value Trqcom.

Further, in a regenerative braking operation of the motor vehicle equipped with motor drive control system 100, torque command value Trqcom of AC motor M1 is set negative (Trqcom<0). In this case, inverter 14 converts the AC voltage generated by AC motor M1 to the DC voltage by performing the switching operations in response to switching control signals Gup, Gun, Gyp, Gvn, Gwp and Own, and provides the converted DC voltage to DC power supply 10 through smoothing capacitor C. The regenerative braking in this description includes braking that is accompanied by regenerative power generation and is performed when a driver of the motor vehicle operates a foot brake, and also includes deceleration (or stop of acceleration) that is accompanied by the regenerative power generation and is performed by releasing an accelerator pedal during running without operating the foot brake.

A current sensor 20 senses the current flowing through AC motor M1, and provides the sensed motor current to control device 30. Since a sum of instantaneous values of three-phase currents iu, iv and iw is zero, current sensor 24 can be arranged to sense merely the motor currents of two phases (e.g., V- and W-phase currents iv and iw) as shown in FIG. 1.

A rotation angle sensor (resolver) 22 senses a rotor rotation angle θ of AC motor M1, and sends sensed rotation angle θ to control device 30. Control device 30 can calculate the number of rotations, i.e., rotation speed Neat and electrical frequency fm of AC motor M1 based on rotation angle θ. Rotation angle sensor 22 can be eliminated when control device 30 is configured to calculate directly rotation angle θ from the motor voltage and current.

Control device 30 is formed of an Electronic Control Unit (ECU), and controls the operation of motor drive control system 100 by software processing performed by the CPU (not shown) executing prestored programs and/or by hardware processing performed by a dedicated electronic circuit.

By a typical function, control device 30 operates based on provided torque command value Trqcom, motor currents iv and iw provided from current sensor 20, rotation angle θ provided from rotation angle sensor 22 and others. Thereby, control device 30 produces switching control signals Gup, Gun, Gyp, Gvn, Gwp and Gwn for controlling inverter 14, and provides them to inverter 14 so that AC motor M1 may output the torque according to torque command value Trqcom according to the PWM control based on a voltage comparison between a sinusoidal voltage command and a carrier.

Control device 30 includes, as motor control components for the PWM control, a voltage command arithmetic unit 302, a synchronous PWM control circuit 304 and a carrier generating circuit 306.

Voltage command arithmetic unit 302 calculates operation quantities (which may also be referred to as "voltage commands" hereinafter) Vu, Vv and Vw of the voltages to be applied to the respective coils of the U-, V- and W-phases of AC motor M1, based on provided torque command value Trqcom of AC motor M1, motor currents iv and iw provided from current sensor 20 and rotation angle θ provided from rotation angle sensor 22.

Carrier generating circuit 306 calculates electrical frequency fm of AC motor M1 based on the output (rotation angle θ) of rotation angle sensor 22. Carrier generating circuit 306 calculates a carrier frequency fc used in the synchronous PWM control based on electrical frequency fm of AC motor M1, and generates the carrier of carrier frequency fc thus calculated. The carrier can be formed of a triangular wave or a saw-toothed wave having frequency fc. A triangular wave is used in the following example.

The synchronous PWM control controls carrier frequency fc so that a frequency ratio fc/fm of carrier frequency fc with respect to electrical frequency fm of AC motor M1 is equal to k (k: an integer larger than 1). Thereby, the synchronous PWM control is performed to provide the carrier of which pulses contained in one period, i.e., within the electrical angle of 360 degrees of AC motor M1 are equal in number to constant value k. This embodiment employs the synchronous PWM control and distinguishes it from so-called rectangular wave voltage control in which a rectangular-wave voltage of one positive pulse and one negative pulse is applied in synchronization with the electrical frequency of AC motor M1. Therefore, the foregoing relationship of (k≧2) is employed.

In the synchronous PWM control, frequency ratio fc/fm is changed according to electrical frequency fm for keeping frequency ratio fc/fm equal to an integer, and for keeping carrier frequency fc at a low value. Further, according to the embodiment, frequency ratio fc/fm is set variable according to the operation state (torque and rotation speed) of AC motor M1 for the purpose of lowering the inverter loss when the output torque is high, as will be described later.

Since the phase voltage command is synchronized with the electrical frequency of AC motor M1, a frequency ratio between the carrier and the phase voltage command is k:1.

Synchronous PWM control circuit 304 compares the carrier generated by carrier generating circuit 306 with each of sinusoidal voltage command Vu, Vv or Vw of each phase calculated by voltage command arithmetic unit 302, and generates switching control signals Gup, Gun, Gvp, Gvn, Gwp and Own for controlling inverter 14 based on a result of the comparison.

More specifically, synchronous PWM control circuit 304 includes comparators 40, 42 and 44 corresponding to respective phase voltage commands Vu, Vv and Vw as well as NOT circuits 50, 52 and 54 corresponding to respective comparators 40, 42 and 44.

Comparator 40 compares sinusoidal U-phase voltage command Vu with the carrier (triangular wave), and outputs a result of the comparison. Comparator 40 provides a comparison result signal, as switching control signal Gun, to a gate of switching element Quit forming the U-phase upper arm. NOT circuit 50 inverts the comparison result signal and provides the inverted signal, as switching control signal Gup, to a gate of switching element Qup forming the U-phase lower arm.

Comparators 42 and 44 as well as NOT circuit 52 and 54 perform the operations of comparing the corresponding voltage commands with the carrier as well as the operations of inverting the comparison result signals in the substantially same manner, and thereby produce switching control signals Gyp, Gvn, Gwp and Own, which are provided to the gates of switching elements Qvp, Qvn, Qwp and Qwn, respectively.

Figure 2:
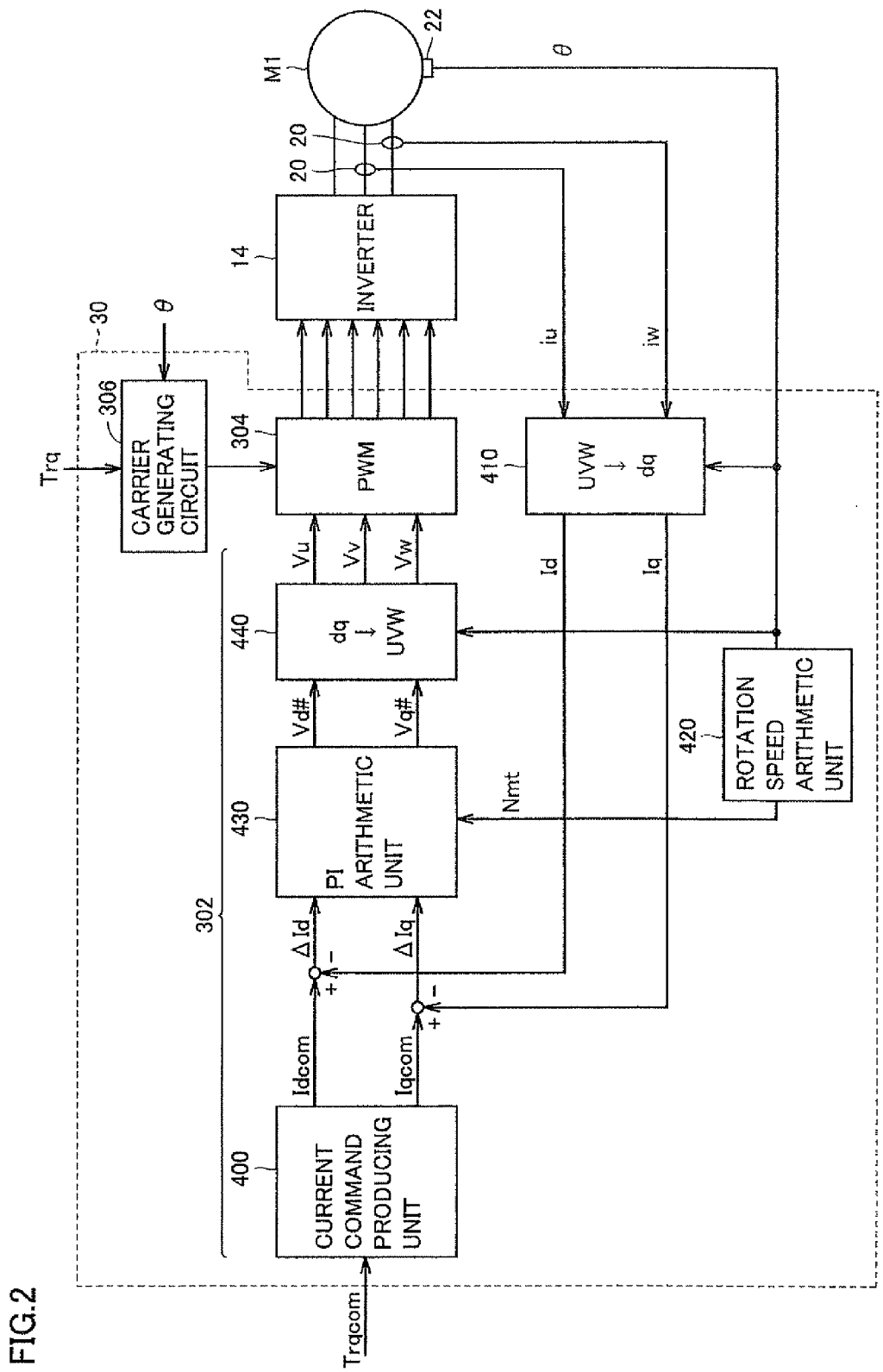
FIG. 2 is a block diagram illustrating details of a motor control structure in the control device in FIG. 1.

FIG. 2 is a block diagram illustrating details of the structure of the motor control by control device 30 in FIG. 1. Each block shown in FIG. 2 is implemented by hardware processing or software processing executed by control device 30.

Referring to FIG. 2, control device 30 includes a current command producing unit 400, coordinate transforming units 410 and 440, a rotation speed arithmetic unit 420, a PI arithmetic unit 430, synchronous PWM control circuit 304 (FIG. 1) and carrier generating circuit 306 (FIG. 1). Current command producing unit 400, coordinate transforming units 410 and 440, rotation speed arithmetic unit 420 and PI arithmetic unit 430 form voltage command arithmetic unit 302 shown in FIG. 1.

Current command producing unit 400 produces d- and q-axis current command values Idcom and Iqcom corresponding to torque command value Trqcom according to a table or the like that is prepared in advance.

Coordinate transforming unit 410 performs coordinate transformation (from 3 phases to 2 phases) using rotation angle θ of AC motor M1 sensed by rotation angle sensor 22, and thereby calculates d- and q-axis currents Id and Iq based on V- and W-phase currents iv and iw sensed by current sensor 20.

Rotation speed arithmetic unit 420 calculates a rotation speed Nmt of AC motor M1 based on the output (rotation angle θ) of rotation angle sensor 22.

PI arithmetic unit 430 receives deviations ΔId (ΔId=Idcom−Id) and ΔIq (ΔIq=Iqcom−Iq) of d- and q-axis currents with respect to the respective command values. PI arithmetic unit 430 obtains the control deviations by performing the PI arithmetic on d- and q-axis current deviations ΔId and ΔIq with predetermined gains, and produces d- and q-axis voltage commands Vd# and Vq# corresponding to the respective control deviations.

Coordinate transforming unit 440 performs the coordinate transformation (from 2 phases to three phases) using rotation angle θ of AC motor M1, and thereby transforms d- and q-axis voltage commands Vd# and Vq# to voltage commands Vu, Vv and Vw of the respective phases. The transformation of d- and q-axis voltage commands Vd# and Vq# to voltage commands Vu, Vv and Vw of the respective phases also reflects the input voltage of inverter 14.

Figure 3:
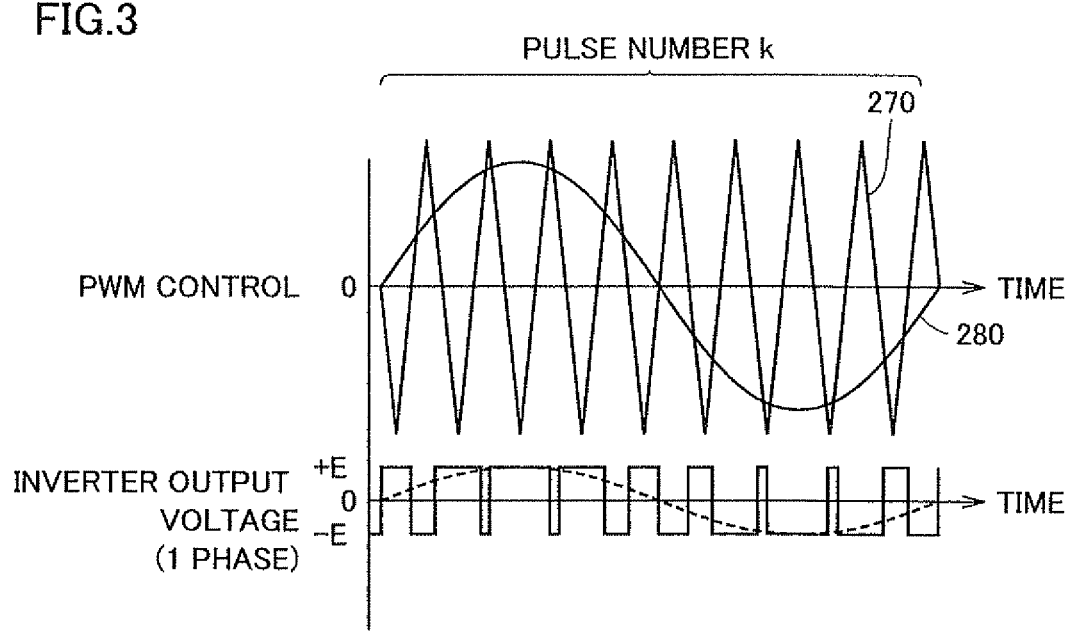
FIG. 3 is a waveform diagram illustrating an operation of a synchronous PWM control circuit in FIG. 2.

As shown in FIG. 3, synchronous PWM control circuit 304 produces a pseudo sinusoidal voltage of each phase of AC motor M1 by controlling the on/off of the switching elements forming the upper and lower arms of each phase of inverter 14 based on a comparison between a carrier 270 generated by carrier generating circuit 306 and a voltage command (collectively representing Vu, Vv and Vw) 280 provided from coordinate transforming unit 440.

According to the synchronous PWM control, as illustrated in FIG. 1, carrier generating circuit 306 controls carrier frequency fc according to the rotation speed of AC motor M1 so that carrier frequency fc may be k times as large as the frequency of the voltage command (i.e., electrical frequency fm) according to the rotation speed of AC motor M1. Carrier generating circuit 306 produces carrier 270 in synchronization with the phase of voltage command 280. Thereby, a number k of pulses in one rotation (electrical angle of 360 degrees) of AC motor M1 becomes equal to a predetermined value according to the synchronous PWM control.

In the following description, when carrier frequency fc is k times as large as electrical frequency fm, and the pulse number is k, it is stated that the synchronization number is k. Thus, the frequency ratio and the pulse number will be described using the term "synchronization number". When AC motor M1 is a three-phase motor, this synchronization number is generally set to a multiple of 3 in view of positive-negative symmetry of the pulse width voltage applied to AC motor M1. In this case, the pulse number per rotation of AC motor M1 is controlled to be equal to 3n (n: a natural number).

However, in the vehicle drive inverter, the carrier in the PWM control generally has a relatively high frequency for avoiding generation of electromagnetic noises. This is because electromagnetic noises due to switching of the inverter become rough during a low-torque driving such as a steady drive state in which interior noises of the vehicle are low. Therefore, it is desired to set the synchronization number to be at least ten-odd (12, 15 or more) times as large as electrical frequency fm.

Figure 4:
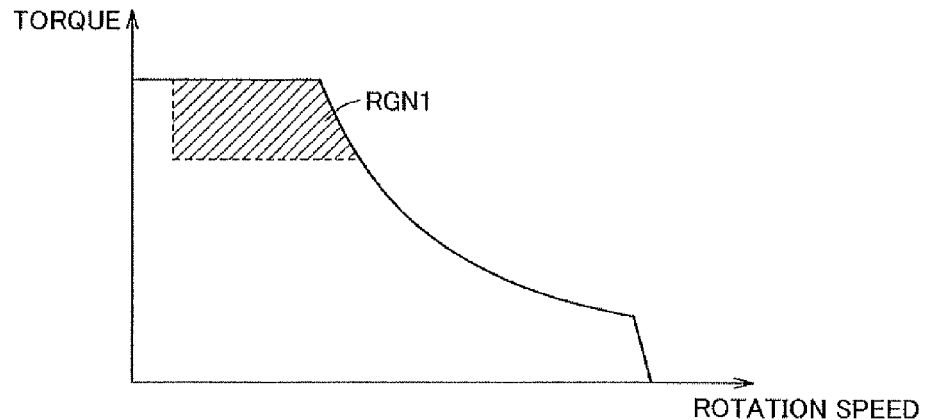
FIG. 4 shows a relationship between a torque and a rotation speed of the AC motor.

However, a higher carrier frequency increases the number of times of switching per unit time, and therefore increases the power loss due to the switching loss. FIG. 4 shows a relationship between the torque and the rotation speed of AC motor M1. In the output characteristics of AC motor M1, and particularly in a region RGN1 where the generated torque is high, the raised carrier frequency increases the switching loss as well as the inverter conduction loss due to a large current. This results in a problem that a heat value increases and the inverter is overheated.

For preventing the overheating in this region, it is preferable to design the inverter so that it can be driven with a high carrier frequency throughout the operation region. However, this increases the sizes and cost of the inverter. Therefore, for avoiding such disadvantages, it is required to implement the PWM control with a relatively low carrier frequency by changing the synchronization number to a lower value, e.g., of 3 or 6 when a high torque is to be generated, e.g., as is done in region RGN1 in FIG. 4. In the following description, "6" is selected as the synchronization number for suppressing the overheating of the inverter while avoiding generation of the electromagnetic noises as far as possible.

Referring to FIGS. 5 to 8, description will be given on the operation of synchronous PWM control circuit 304 in the case where "6" is selected as the synchronization number.

Figure 5:
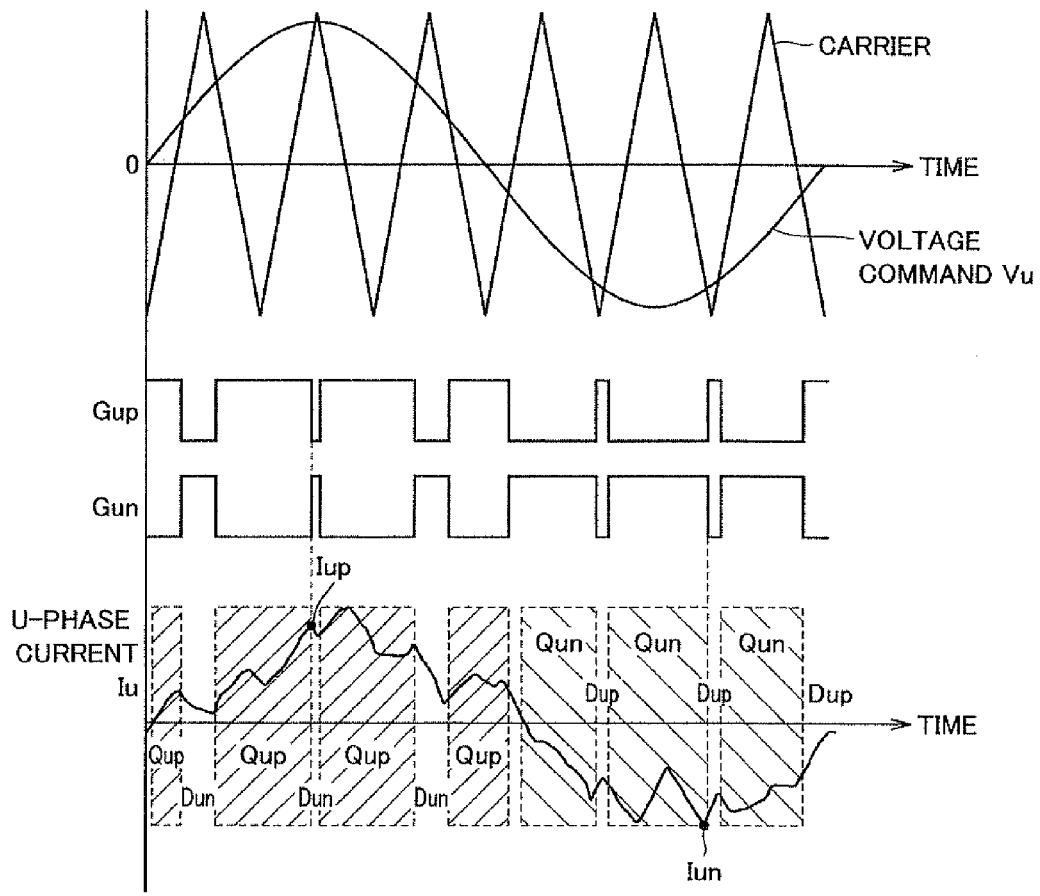
FIG. 5 is a waveform diagram illustrating an operation of the synchronous PWM control circuit in FIG. 1.

FIG. 5 is a waveform diagram illustrating an operation of synchronous PWM control circuit 304 in FIG. 1. As shown in FIG. 5, switching control signals Gup and Gun are produced based on a result of the comparison between the carrier and sinusoidal U-phase voltage command Vu. The on/off of switching elements Qup and Qun forming upper and lower U-phase arms 15 (FIG. 1) is controlled according to switching control signals Gup and Gun so that U-phase current iu flows through AC motor M1. In this state, currents shown in FIG. 5 flow through switching elements Qup and Qun as well as anti-parallel diodes Dup and Dun in inverter 14 according to the on/off of switching elements Qup and Qun so that the conduction losses occur in proportion to the respective current values.

Figure 6:
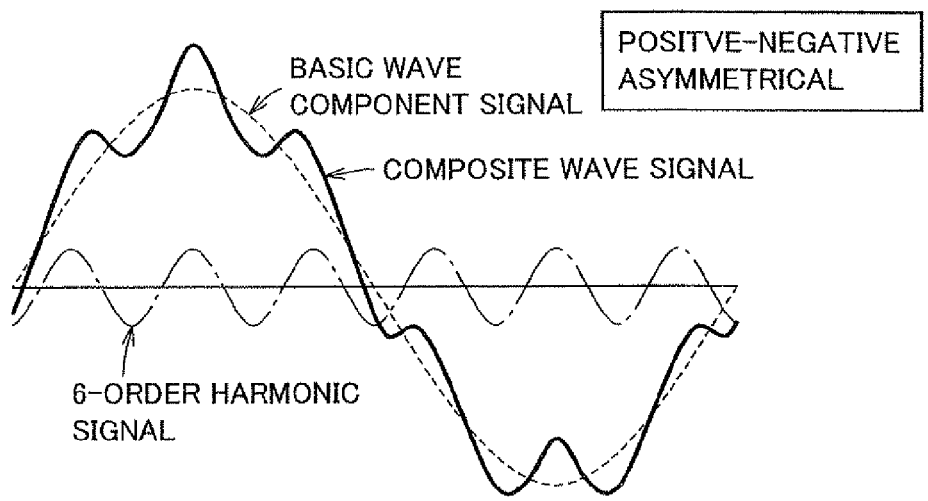
FIG. 6 shows a waveform of a motor current exhibited when a synchronization number is even.
Figure 7:
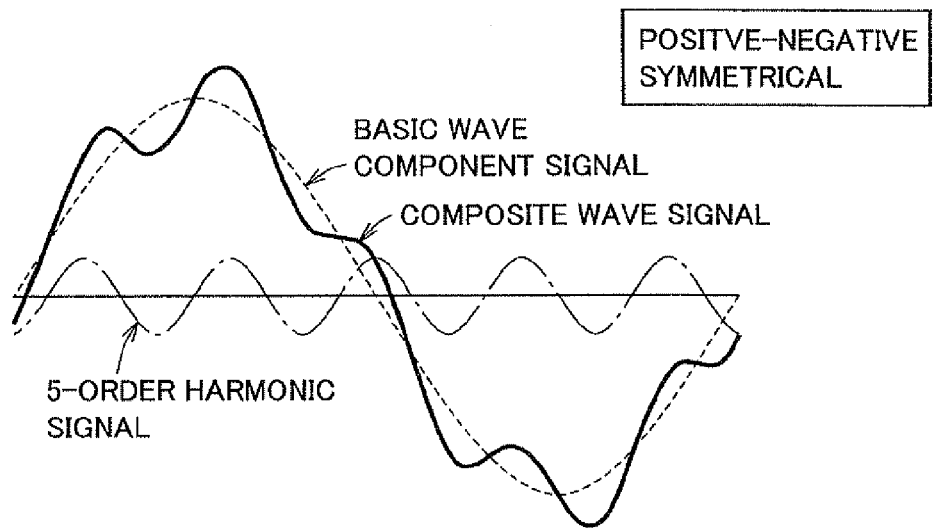
FIG. 7 shows the waveform of the motor current exhibited when the synchronization number is odd.

Since the selected synchronization number is 6, each phase current is asymmetrical with respect to a boundary between the positive and negative portions. This is because even-order harmonic component is superimposed on the motor current due to selection of an even number as the synchronization number. FIG. 6 shows the motor current exhibited when the synchronization number is even. For a comparison, FIG. 7 shows the motor current exhibited when the synchronization number is odd.

Referring to FIG. 6, when the synchronization number is even (e.g., the synchronization number is 6), the six-order harmonic is superimposed on the basic wave component so that the motor current formed of a composite component is asymmetrical with respect to the boundary between the positive and negative portions. Conversely, when the synchronization number is odd (e.g., 5), the motor current formed of the composite component is symmetrical with respect to the boundary between the positive and negative portions as a result of the superimposition of the five-order harmonic on the basic wave component, as shown in FIG. 7.

Therefore, when the synchronization number is 6 as shown in FIG. 5, the motor current is asymmetrical with respect to the boundary between the positive and negative portions due to the superimposition of the even-order harmonic so that a difference in conduction loss occurs between switching elements Qup and Qun, and imbalance occurs in heat value. Current values Iup and Iun that turn off switching elements Qup and Qun, respectively, are different from each other so that an imbalance occurs between the surge currents that flow in switching elements Qup and Qun at the time of turn-off, respectively. This surge voltage is superimposed on the input voltage of the invention, and is applied between the collector and emitter of the switching element in the off state.

These imbalances that occur in heat value and surge voltage between the upper and lower arms of the same phase, respectively, increase as the current increases so that the imbalances become remarkable particularly in the region (region RGN1 in FIG. 4) where a high torque is generated.

Figure 8:
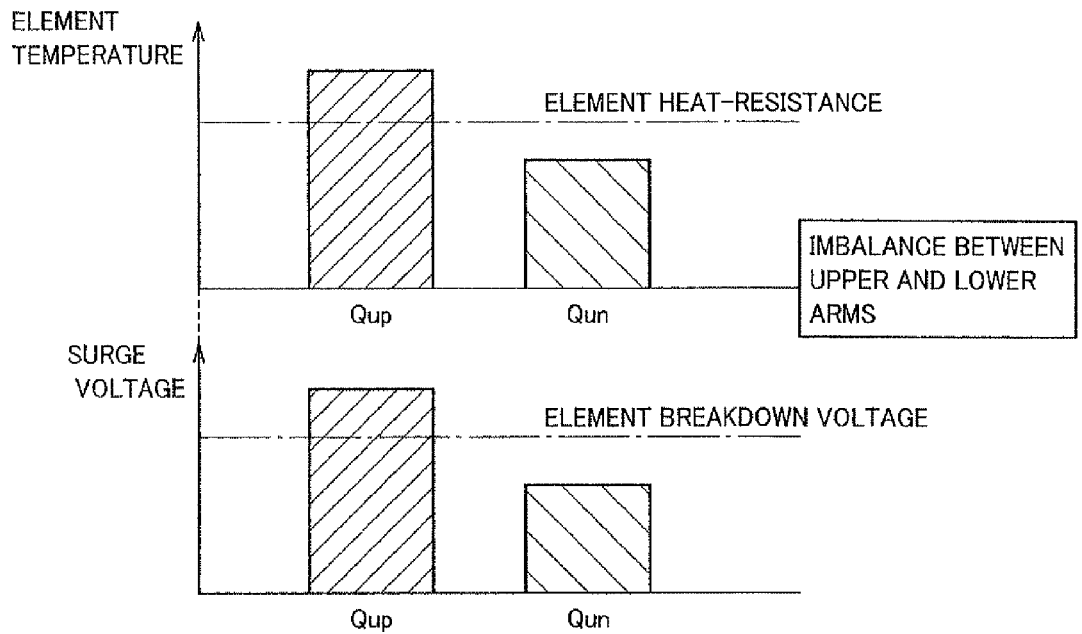
FIG. 8 illustrates a problem arising when the synchronization number is even.

Consequently, as shown in FIG. 8, the switching element (e.g., switching element Qup) of a larger heat value may have an element temperature exceeding a heat-resistant temperature of the switching element. Also, in the switching element (e.g., switching element Qup) of a higher surge voltage, a sum of the inverter input voltage and the surge voltage may exceed an element breakdown voltage of the switching element. This may damage the switching element.

For protecting the switching elements from the imbalance that occurs in heat value and surge voltage of the switching element due to positive-negative asymmetry of the motor current as described above, it is effective to suppress the even-order harmonic component by setting a limit to select always the synchronization number of an odd value. However, in AC motor M1 formed of the three-phase motor, even when the settable synchronization number is the smallest, the synchronization number is restricted to a large value of "9" that is 1.5 times as large as the synchronization number of "6" so that the power loss due to the switching loss increases with increase in carrier frequency. This results in a problem of overheating the AC motor due to the increase in loss.

Accordingly, as a manner of suppressing the positive-negative asymmetry of the motor current that occurs due to the even-order harmonic component, the control device of the AC motor according to the embodiment of the invention is configured to adjust the phase relationship between the voltage command and the carrier according to the synchronization number in the synchronous PWM control. More specifically, the control device variably sets the reference phase of the carrier used for matching with a zero point of the voltage command according to the synchronization number so that the positive-negative symmetry of the motor current may be ensured.

Figure 9:
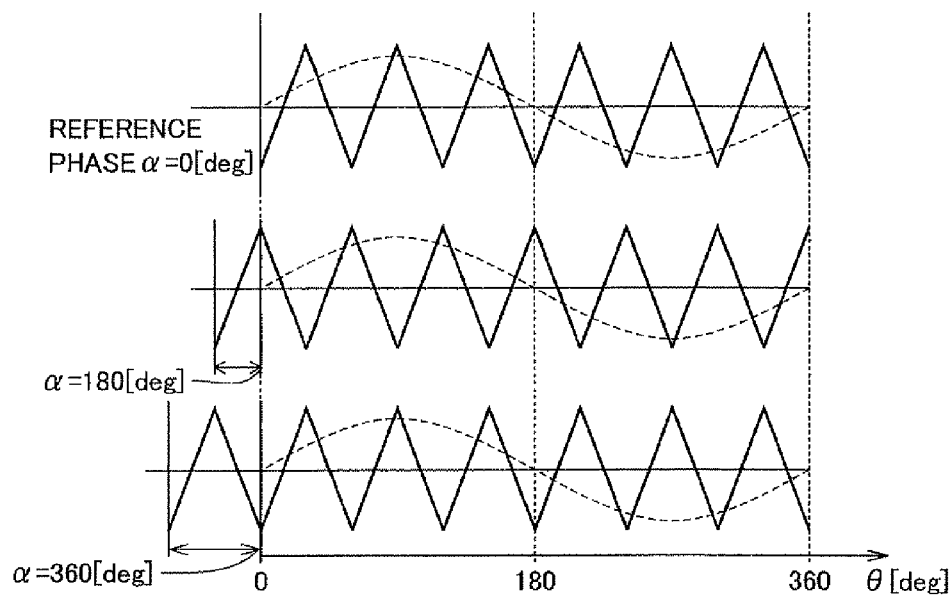
FIG. 9 is a waveform diagram illustrating a reference phase of a carrier for matching with a zero point of a voltage command.

FIG. 9 illustrates the reference phase of the carrier for matching with the zero point of the voltage command.

Referring to FIG. 9, when the synchronization number in the synchronous PWM control is 6, one period of the sinusoidal voltage command is equal to 6 periods of the carrier that is a triangular wave. In FIG. 9, it is assumed that a reference phase α is 0 degrees (α=0 deg.) when the zero point of the voltage command matches with the minimum output of the carrier. Therefore, by gradually increasing reference phase a from an origin of (α=0 deg.), i.e., by gradually shifting the phase of the carrier with respect to the voltage command, reference phase α of the carrier will become equal to 180 degrees (α=180 deg.) when the zero point of the voltage command relatively matches with the maximum value of the carrier. Also, reference phase α of the carrier will become equal to 360 degrees (α=360 deg.) when the zero point of the voltage command matches with the minimum value of the carrier thereafter.

Figure 10:
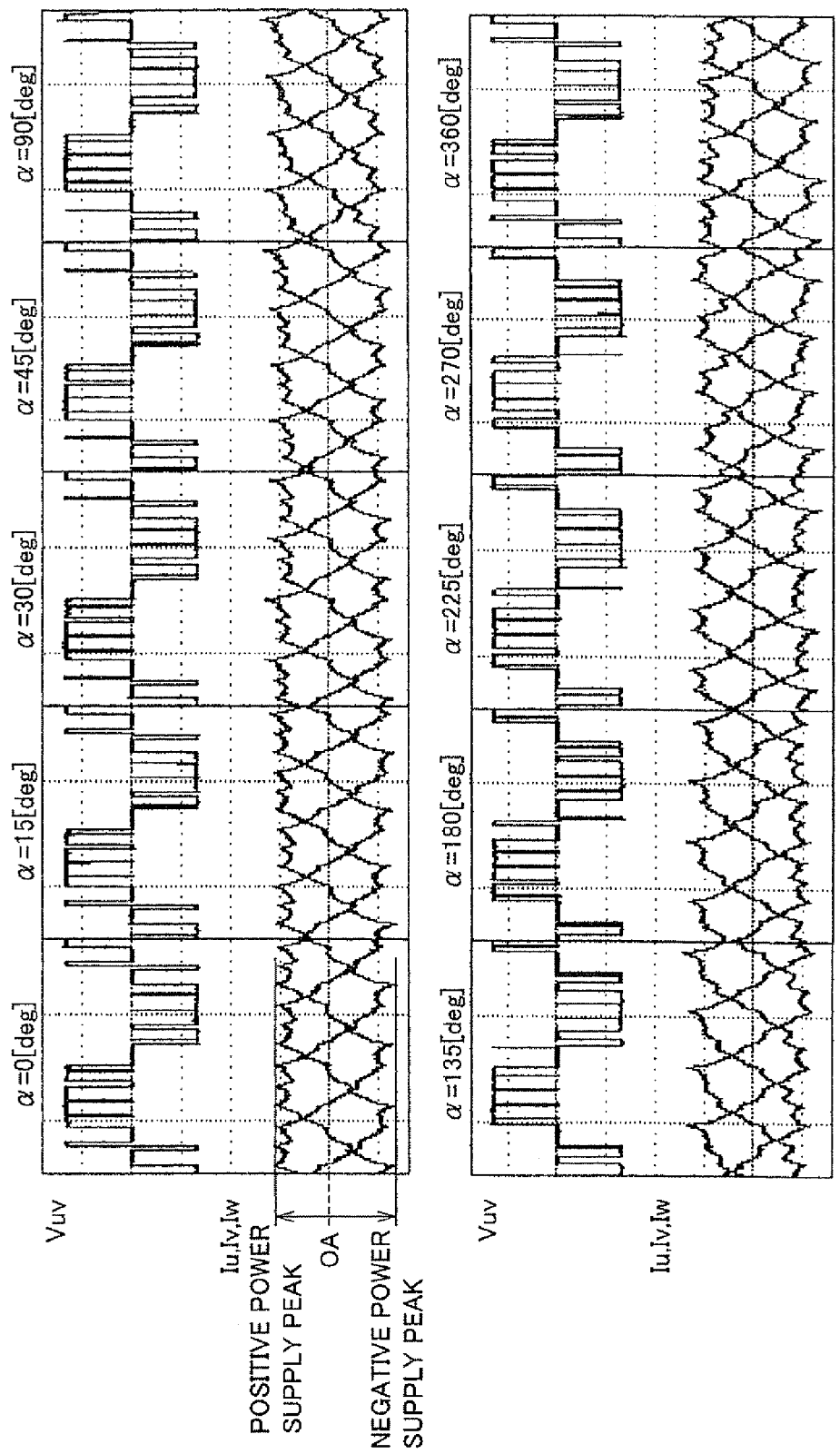
FIG. 10 is a waveform diagram showing changes that occur in motor current and motor terminal voltage when a reference phase of the carrier changes stepwise.

FIG. 10 shows changes in waveforms of motor currents iu, iv and iw flowing between inverter 14 and AC motor M1 as well as a motor terminal voltage (line voltage) Vuv that appear when reference phase α of the carrier changes stepwise.

Referring to FIG. 10, when reference phase α of the carrier gradually changes, the waveforms of the motor current and the motor terminal voltage gradually change. When a positive current peak and a negative current peak are sensed from the waveform of the motor current of each reference phase, a relationship shown in FIG. 11 appears between the current peak of the motor current and reference phase α of the carrier.

Figure 11:
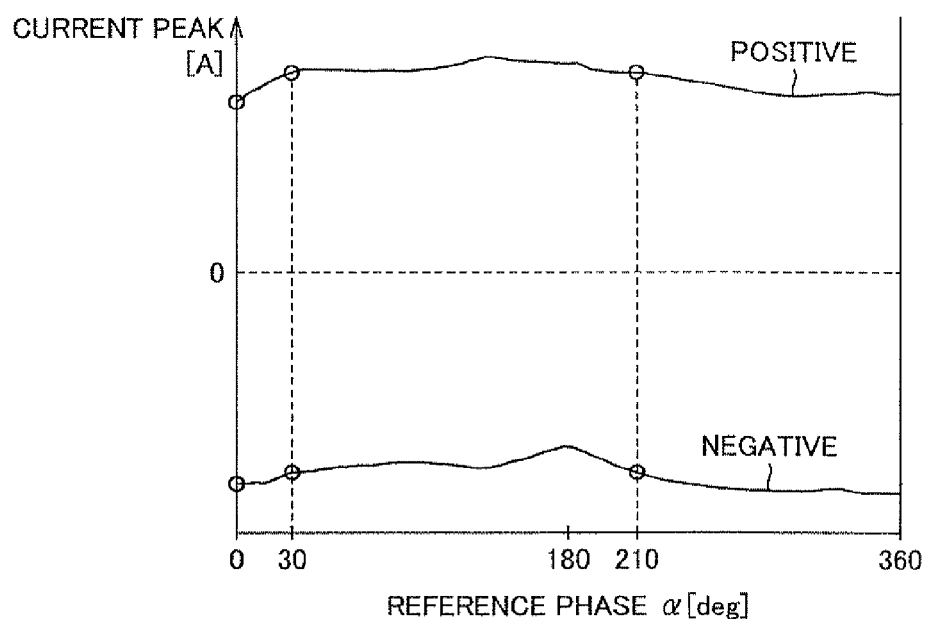
FIG. 11 illustrates current equalizing control in the control device of the AC motor according to the embodiment of the invention.

Referring to FIG. 11, each of the current peaks in the positive and negative directions changes according to reference phase α of the carrier. In the case of FIG. 11, when reference phase α is equal to 30 degrees or 210 degrees, the absolute values of the positive and negative current peaks are equal to each other. Therefore, the positive-negative symmetry of the motor current can be ensured by selecting 30 degrees or 210 degrees as reference phase α of the carrier. The control that adjusts reference phase a of the carrier so that the positive and negative current peaks may be equal to each other will be simply referred to as "current equalization control" hereinafter.

When the synchronization number is even (e.g., 6), the superimposition of the even-order harmonic components corresponding to the synchronization number causes the positive-negative asymmetry in motor current by. However, reference phase α of the carrier is adjusted for matching with the zero point of the voltage command, whereby the positive-negative symmetry of the motor current can be ensured while keeping the synchronization number. Therefore, it is not necessary to switch the synchronization number to a higher odd number (e.g., 9) for suppressing the even-order harmonic component, and therefore it is possible to suppress the increase in power loss due to the switching loss that may be caused by the increase in carrier frequency.

Figure 12:
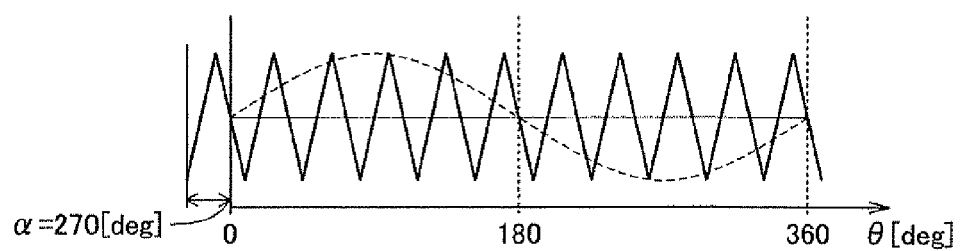
FIG. 12 is a waveform diagram illustrating a reference phase of the carrier in the case where the synchronization number is odd.

When the synchronization number is odd, there is no reason for superimposing the even-order harmonic component on the motor current. Therefore, the positive-negative symmetry of the motor current can be easily ensured by selecting reference phase α (e.g., equal to 270 degrees) so that the state of overlapping of the voltage command and the carrier is symmetrical with respect to a boundary between the positive and negative ranges, as shown in FIG. 12. In the example shown in FIG. 12, the synchronization number is 9, and reference phase α (e.g., equal to 270 degrees) is selected so that the zero point of the voltage command may match with the zero point of the carrier.

The current equalization control described above is executed in the processing of generating the carrier in carrier generating circuit 306 in FIG. 1. Then, detailed description will be given on the processing of generating the carrier in the control device and the control method of the AC motor according to the embodiment of the invention with reference to FIGS. 13 to 19.

Figure 13:
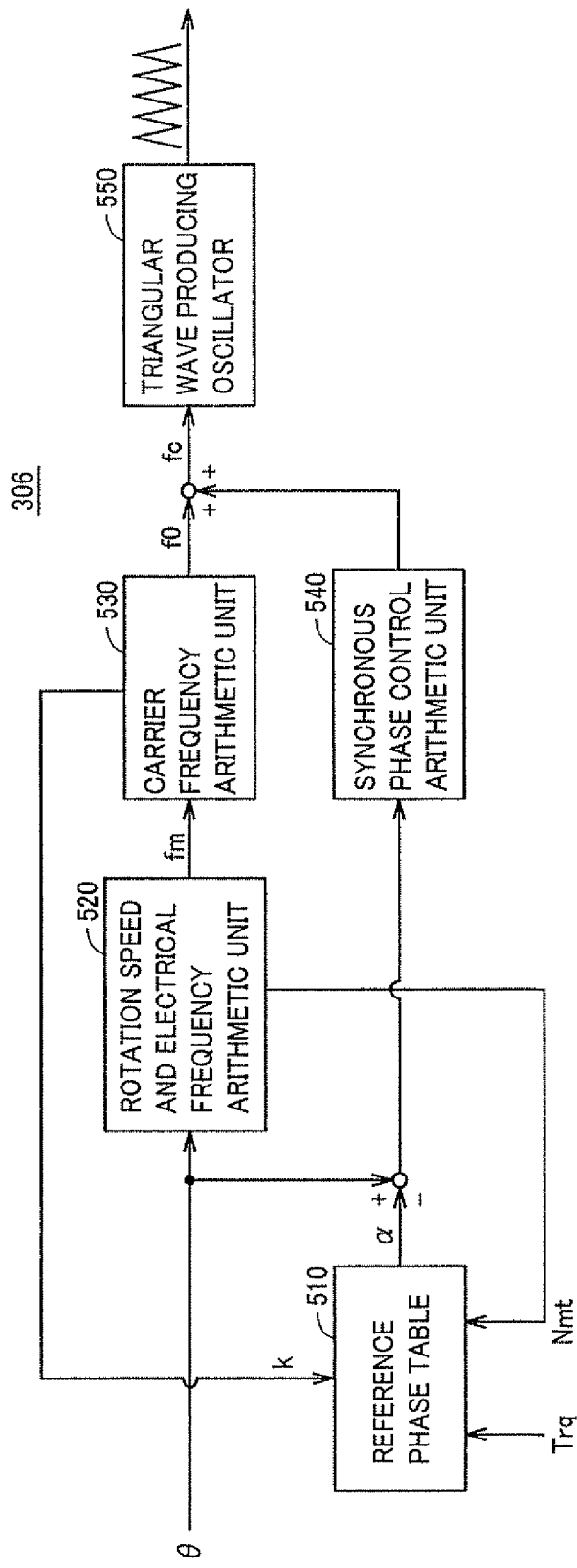
FIG. 13 is a block diagram illustrating an operation of generating a carrier by a carrier generating circuit in FIG. 1.

FIG. 13 is a block diagram illustrating the processing of generating the carrier by carrier generating circuit 306 in FIG. 1. Each block illustrated in FIG. 13 is implemented by the hardware or software processing of control device 30.

Referring to FIG. 13, carrier generating circuit 306 includes a reference phase table 510, a rotation speed and electrical frequency arithmetic unit 520, a carrier frequency arithmetic unit 530, a synchronous phase control arithmetic unit 540 and a triangular wave producing oscillator 550.

Rotation speed and electrical frequency arithmetic unit 520 calculates rotation speed Nmt and electrical frequency fm of AC motor M1 based on the output (rotation angle θ) of rotation angle sensor 22. More specifically, rotation speed Nmt [rpm] and electrical frequency fm [Hz] are calculated according to the following equations (1) and (2):

$$Nmt = \Delta\theta[deg]/\Delta t[sec]/360[rotation/deg] \times 60 \quad (1)$$

$$fm = Nmt[rpm]/60 \times p \quad (2)$$

where p in the equation (2) is a number of pole pairs in AC motor M1.

Reference phase table 510 is prepared in advance as a table for setting reference phase α of the carrier required for ensuring the positive-negative symmetry of the motor current with respect to the synchronization number in the synchronous PWM that is preset. The reference phase table is prepared for each synchronization number, and is prepared as follows. By an experiment or the like, a relationship between the current peak of the motor current and reference phase α of the carrier is obtained for each synchronization number shown in FIG. 11, and reference phase α that appears when the positive and negative current peaks become equal to each other is extracted from the above relationship so that the reference phase table is prepared.

Figures 14, 15:
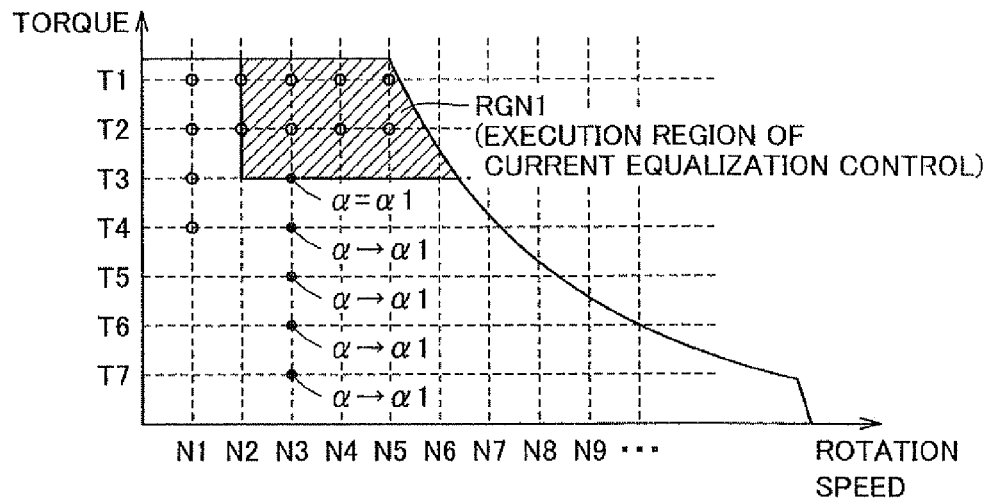
FIG. 14 illustrates an example of a phase reference table in the case where the synchronization number is 6.
FIG. 15 illustrates an example of the phase reference table in the case where the synchronization number is 6.

Further, in reference phase table 510, reference phase α is variably set for each synchronization number according to the operation state (output torque Trq and rotation speed Nmt of AC motor M1) of AC motor M1. FIGS. 14 and 15 illustrate an example of the reference phase table in the case where the synchronization number is 6.

Referring to FIGS. 14 and 15, reference phase α of the carrier is variably set according to the operation state (torque Trq and rotation speed Nmt) of AC motor M1. In this embodiment, the foregoing current equalization control is executed in the region where the torque is equal to or larger than a threshold T3, as can be seen in region RGN1 in FIG. 14. In the region where the torque is smaller than threshold T3, the current equalization control is not executed. Region RGN1 in FIG. 14 substantially corresponds to region RGN1 in FIG. 4 for the following reason. In this region, there is high possibility that the imbalances in heat value and surge voltage of the switching elements due to positive-negative asymmetry of the motor current may damage the switching elements, and therefore it is determined that the execution of the current equalization control is required.

FIG. 15 shows, as an example of the reference phase table, reference phase α that is set for each state of AC motor M1 in FIG. 14. In FIG. 15, lowermost reference phase α (=α1) itself in region RGN1 is used, as reference phase α in the regions other than region RGN1 in FIG. 14 where the current equalization control is executed. This is for preventing rapid change in phase of the carrier that may be caused by switching between execution and non-execution of the current equalization control.

Referring to FIG. 13 again, reference phase α of the carrier is set in reference phase table 510 based on synchronization number k in the preset synchronous PWM control, output torque Trq of AC motor M1 and rotation speed Nmt calculated by rotation speed and electrical frequency arithmetic unit 520. Torque Trq can be obtained from an electric power Pm obtained according to a product of the voltage and current of each phase of AC motor M1 as well as electrical frequency fm (Trq=Pm/fm), Alternatively, a torque sensor (not shown) may be arranged for sensing torque Trq.

Carrier frequency arithmetic unit 530 calculates a basic carrier frequency f0 required for performing the synchronous PWM control according to the following equation (3), based on electrical frequency fm calculated by rotation speed and electrical frequency arithmetic unit 520 and the synchronization number in the synchronous PWM control.

$$f0 = k \cdot fm \quad (3)$$

In the equation (3), synchronization number k is switched according to electrical frequency fm for keeping carrier frequency fc low as already described, and is set variable according to the operation state (the torque and rotation speed) of AC motor M1 for the purpose of lowering the inverter loss during output of a high torque. In this embodiment, the synchronization number is switched to a relatively small value (e.g., 6 that is a minimum value required for the synchronous PWM control) in the region (region RGN1 in FIG. 4) where a particularly high torque is output. Synchronization number k set by carrier frequency arithmetic unit 530 is sent to reference phase table 510.

Figure 16:
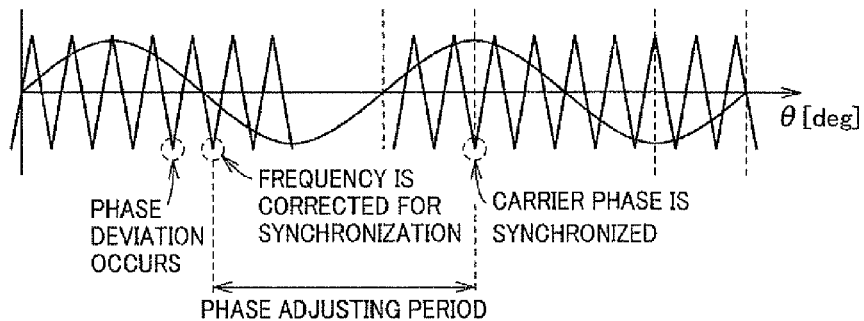
FIG. 16 is a waveform diagram illustrating an operation of a synchronous phase control arithmetic unit in FIG. 13.

Synchronous phase control arithmetic unit 540 corrects basic carrier frequency f0 according to the output (rotation angle θ) of rotation angle sensor 22 so that the voltage command and the carrier may be synchronized with each other while keeping the phase relationship (reference phase a) set by reference phase table 510. More specifically, as shown in FIG. 16, when electrical frequency fm changes due to the change in rotation speed Nmt of AC motor M1, and thereby a phase deviation occurs in the carrier with respect to the voltage command, basic carrier frequency ft) is corrected so that the voltage command and the carrier may reattain the desired phase relationship set by reference phase table 510. When the phase of the carrier advances with respect to the desired phase relationship, basic carrier frequency f0 is corrected to raise the frequency. When the phase of the carrier is delayed with respect to the desired phase relationship, basic carrier frequency ID is corrected to lower the frequency.

The carrier frequency thus corrected is provided as frequency command fc to triangular wave producing oscillator 550. Triangular wave producing oscillator 550 produces a triangular wave of carrier frequency fc indicated by frequency command fc.

Figure 17:
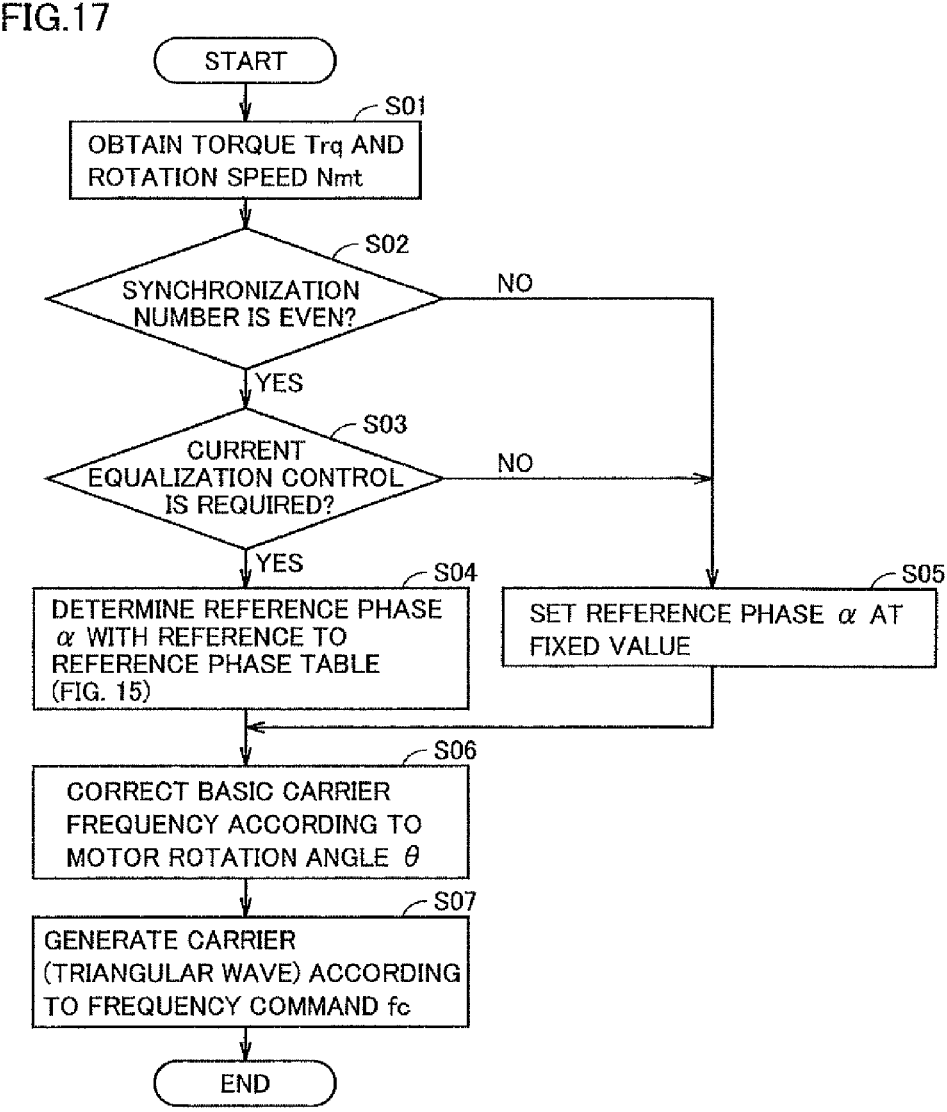
FIG. 17 is a flowchart for illustrating an operation of generating the carrier by the carrier generating circuit.

FIG. 17 is a flowchart for illustrating the processing of generating the carrier by carrier generating circuit 306. The processing in this flowchart is called up from a main routine of the running control of the vehicle at predetermined time intervals or every time predetermined conditions are satisfied.

Referring to FIG. 17, when the processing starts, torque Trq and rotation speed Nmt of AC motor M1 are obtained in a step S01. Rotation speed Nmt in step S01 is obtained by the arithmetic based on rotation angle θ and performed in rotation speed and electrical frequency arithmetic unit 520 in FIG. 13. As described before, torque Trq in step S01 may be obtained by the arithmetic based on the voltage, current and electrical frequency of AC motor M1, or may be implemented only by taking in the output of the torque sensor. In a step S02, it is determined whether synchronization number k in the preset synchronous PWM control is even or not.

When the synchronization number is odd (NO in S02), carrier generating circuit 306 sets reference phase α of the carrier to a predetermined fixed value in a step S05. This fixed value is set as a reference phase α (e.g., 270 degrees) with which the overlapping state of the carrier and the voltage command exhibits the positive-negative symmetry, as already described with reference to FIG. 12.

Conversely, when the synchronization number is even (YES in S02), carrier generating circuit 306 further determines in a step S03 based on the operation state (torque Trq and rotation speed Nmt) of AC motor M1 whether the current equalizing control is to be performed or not. This determination is performed by determining whether torque Trq and rotation speed Nmt of AC motor M1 are present within region RGN1 in FIG. 14 or not.

When the current equalization control is not required (NO in S03), carrier generating circuit 306 sets reference phase α of the carrier at a predetermined fixed value in step S05. As already described with reference to FIG. 14, lowermost reference phase α1 in region RGN1 is used as the above fixed value.

When the current equalization control is required (YES in S03), carrier generating circuit 306 refers to the reference phase table (FIG. 15), and sets reference phase α of the carrier based on torque Trq and rotation speed Nmt of AC motor M1 in a step S04.

When reference phase α of the carrier is set in step S04 or S05, carrier generating circuit 306 corrects basic carrier frequency f0 according to the output (rotation angle θ) of rotation angle sensor 22 in a step S06 so that the voltage command and the carrier may be synchronized with each other while maintaining the phase relationship thus set. Basic carrier frequency f0 is calculated based on determined synchronization number k and calculated electrical frequency fm. Calculated basic carrier frequency f0 is corrected according to the direction and magnitude of the phase deviation of the carrier with respect to the voltage command.

When the corrected carrier frequency is provided as frequency command fc to triangular wave producing oscillator 550 in FIG. 13, it generates a triangular wave of carrier frequency fc indicated by frequency command fc.

[Modification]

Figure 18:
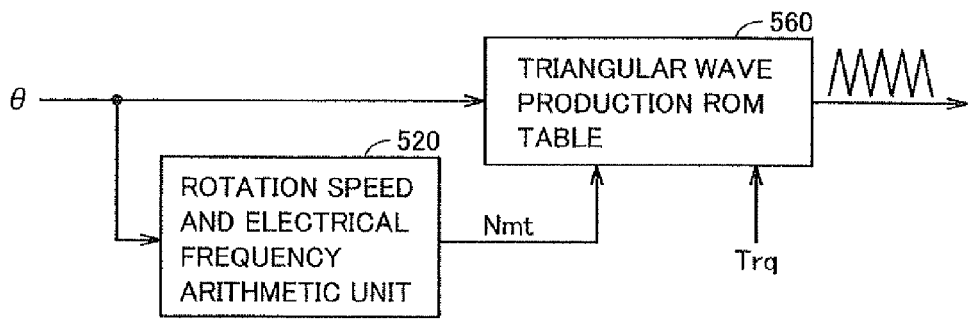
FIG. 18 is a block diagram illustrating an operation of generating the carrier by a carrier generating circuit according to a modification of the embodiment of the invention.

FIG. 18 is a block diagram illustrating an operation of generating a carrier by a carrier generating circuit 306A according to a modification of the embodiment of the invention. Each block shown in FIG. 18 is implemented by hardware processing or software processing performed by control device 30 (FIG. 1).

Referring to FIG. 18, carrier generating circuit 306A includes a rotation speed and electrical frequency arithmetic unit 520 and a triangular wave production ROM table 560.

Rotation speed and electrical frequency arithmetic unit 520 calculates rotation speed Nmt of AC motor M1 from the foregoing equation (1) based on the output (rotation angle θ) of rotation angle sensor 22.

Triangular wave production ROM table 560 is prepared in advance for setting an output waveform of the carrier (triangular wave) that can ensure the positive-negative symmetry of the motor current with the preset synchronization number of the synchronous PWM. This triangular wave production ROM table 560 is prepared for each synchronization number, and particularly is prepared based on a result of obtaining for each synchronization number, by an experiment or the like, the relationship that is exhibited between the current peak of the motor current and reference phase α of the carrier as shown in FIG. 11.

Figure 19:
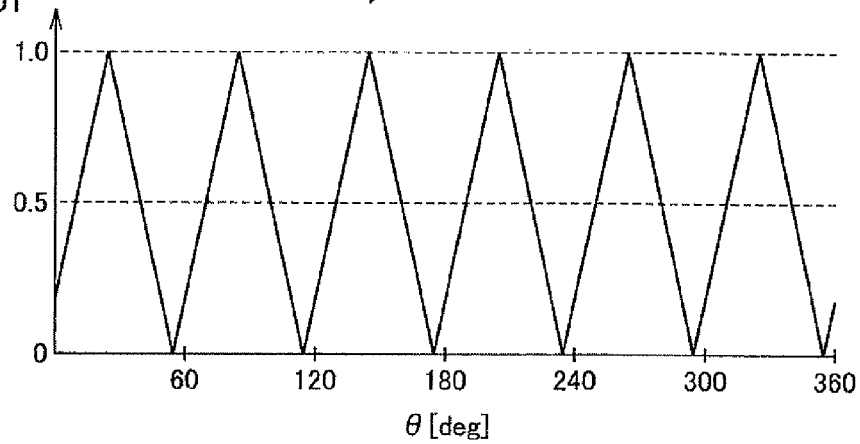
FIG. 19 illustrates an example of a triangular wave production ROM table in FIG. 18.

Further, triangular wave production ROM table 560 variably sets, for each synchronization number, the output waveform (phase) of the triangular wave according to the operation state of AC motor M1 (output torque Trq and rotation speed Nmt of AC motor M1). FIG. 19 illustrates an example of the triangular wave production ROM table in the case where the synchronization number is 6.

Referring to FIG. 19, the output waveform (phase) of the carrier (triangular wave) is variably set according to the operation state (torque Trq and rotation speed Nmt) of AC motor M1. More specifically, the relationship between phase θ of the voltage command and the carrier output is set for one combination of torque Trq and rotation speed Nmt. For example, in FIG. 19(A), when torque Trq of AC motor M1 is equal to T1, and rotation speed Nmt is equal to N5, the carrier output that is set for each phase θ of the voltage command has a waveform shown in FIG. 19(B). The carrier shown in FIG. 19(B) has a phase relationship that ensures the positive-negative symmetry of the motor current with respect to the voltage command (not shown). Thus, in this modification, the output waveform of the carrier (triangular wave) is determined in advance so that the carrier may have reference phase α set for each state of AC motor M1.

Referring to FIG. 18, triangular wave production ROM table 560 determines the carrier output based on the synchronization number in the synchronous PWM control that is set in advance, output torque Trq of AC motor M1 and rotation speed Nmt calculated by rotation speed and electrical frequency arithmetic unit 520, and the determined carrier is produced according to phase θ of the voltage command.

According to the control device of the AC motor of the embodiment of the invention, as described above, even when the even-order harmonic component is superimposed on the motor current, the positive-negative symmetry of the motor current can be ensured by adjusting the phase relationship between the voltage command and the carrier. Thereby, the synchronization number of an even number can be selected, which increases flexibility in selection of the synchronization number. Consequently, when the output torque is high and thus the inverter generates a large amount of heat, the carrier frequency can be lowered by lowering the synchronization number, and thereby the number of times of the switching can be reduced to suppress the increase in electric power loss due to the switching loss.

According to the embodiment, AC motor M1 that is a load of the motor drive control system 100 is the permanent magnet motor mounted on the motor vehicle (the hybrid vehicle, electric vehicle or the like) for driving the vehicle. However, the invention can be applied to a structure that employs, as a load, an arbitrary AC motor used in a device other than the above.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The invention can be applied to the synchronous PWM control of the AC motor.

REFERENCE SIGNS LIST 2 power supply line, 4 ground line, 10 DC power supply, 14 inverter, 15 upper and lower U-phase arms, 16 upper and lower V-phase arms, 17 upper and lower W-phase arms, 20 current sensor, 22 rotation angle sensor, 30 control device, 40, 42 and 44 comparator, 50, 52 and 54 NOT circuit, 100 motor drive control system, 270 carrier, 280 voltage command, 302 voltage command arithmetic unit, 304 synchronous PWM control circuit, 306 and 306A carrier generating circuit, 400 current command producing unit, 410 and 440 coordinate transforming unit, 420 rotation speed arithmetic unit, 430 PI arithmetic unit, 510 reference phase table, 520 rotation speed and electrical frequency arithmetic unit, 530 carrier frequency arithmetic unit, 540 synchronous phase control arithmetic unit, 550 triangular wave producing oscillator, 560 triangular wave production ROM table, C smoothing capacitor, Dup, Dun, Dvp, Dvn, Dwp, Dwn anti-parallel diode, M1 AC motor, Qup, Qun, Qvp, Qvn, Qwp, Qwn switching element

The invention claimed is:

1. A control device for an AC motor supplied with a voltage controlled by an inverter, comprising:
   a pulse width modulation control unit for generating a control command for said inverter by performing pulse width modulation control based on a comparison between a sinusoidal voltage command signal for operating said AC motor according to an operation command and a carrier signal; and
   a carrier generating unit for keeping an integer as a synchronization number being a frequency ratio between said voltage command signal and said carrier signal, and producing said carrier signal by switching said synchronization number according to an operation state of said AC motor, wherein
   said carrier generating unit adjusts a phase relationship between said voltage command signal and said carrier signal according to said synchronization number such that an AC current transmitted between said inverter and said AC motor according to said control command provided from said pulse width modulation control unit is symmetrical with respect to a boundary between positive and negative portions.

2. The control device for the AC motor according to claim 1, wherein
   said carrier generating unit includes:
   a frequency control unit for controlling a frequency of said carrier signal according to an electrical frequency of said AC motor such that the frequency of said carrier signal is equal to a product of the electrical frequency of said AC motor and said synchronization number,
   a reference phase setting unit for setting, according to said synchronization number, a reference phase of said carrier signal to be matched with a zero point of said voltage command signal such that said AC current is symmetrical with respect to the boundary between the positive and negative portions, and
   a synchronous phase control unit for correcting the frequency of said carrier signal such that said voltage command signal and said carrier signal are synchronized with each other while keeping a phase relationship set by said reference phase setting unit.

3. The control device for the AC motor according to claim 2, wherein
   said reference phase setting unit variably sets the reference phase of said carrier signal according to an operation state of said AC motor when said synchronization number is even.

4. The control device for the AC motor according to claim 3, wherein
   said frequency control unit controls the frequency of said carrier signal according to the electrical frequency of said AC motor to decrease said synchronization number when a torque of said AC motor is equal to or larger than a threshold, and
   said reference phase setting unit variably sets the reference phase of said carrier signal according to the torque and a rotation speed of said AC motor when said synchronization number is even and the torque of said AC motor is equal to or larger than said threshold.

5. A control method for an AC motor supplied with a voltage controlled by an inverter, comprising the steps of:
   generating a control command for said inverter by performing pulse width modulation control based on a comparison between a sinusoidal voltage command signal for operating said AC motor according to an operation command and a carrier signal; and
   producing said carrier signal by switching a synchronization number being a frequency ratio between said voltage command signal and said carrier signal according to an operation state of said AC motor while keeping an integer as a synchronization number, wherein
   said step of producing said carrier signal adjusts a phase relationship between said voltage command signal and said carrier signal according to said synchronization number such that an AC current transmitted between said inverter and said AC motor according to said control command is symmetrical with respect to a boundary between positive and negative portions.

6. The control method for the AC motor according to claim 5, wherein
said step of producing said carrier signal includes the steps of
controlling a frequency of said carrier signal according to an electrical frequency of said AC motor such that the frequency of said carrier signal is equal to a product of the electrical frequency of said AC motor and said synchronization number,
setting, according to said synchronization number, a reference phase of said carrier signal to be matched with a zero point of said voltage command signal such that said AC current is symmetrical with respect to the boundary between the positive and negative portions, and
correcting the frequency of said carrier signal such that said voltage command signal and said carrier signal are synchronized with each other while keeping a phase relationship set by said step of setting said reference phase.

7. The control method for the AC motor according to claim 6, wherein
said step of setting said reference phase variably sets the reference phase of said carrier signal according to an operation state of said AC motor when said synchronization number is even.

8. The control method for the AC motor according to claim 7, wherein
said step of controlling the frequency of said carrier signal controls the frequency of said carrier signal according to the electrical frequency of said AC motor to decrease said synchronization number when a torque of said AC motor is equal to or larger than a threshold, and
said step of setting said reference phase variably sets the reference phase of said carrier signal according to the torque and a rotation speed of said AC motor when said synchronization number is even and the torque of said AC motor is equal to or larger than said threshold.

* * * * *